(12) United States Patent
Knight

(10) Patent No.: US 11,513,022 B2
(45) Date of Patent: Nov. 29, 2022

(54) VALVE ASSEMBLY AND METHOD FOR LEAK TESTING PIPES USING THE VALVE ASSEMBLY

(71) Applicant: Glenn Walter Knight, Brisbane (AU)

(72) Inventor: Glenn Walter Knight, Brisbane (AU)

( * ) Notice: Subject to any disclaimer, the term of this patent is extended or adjusted under 35 U.S.C. 154(b) by 864 days.

(21) Appl. No.: 16/336,556

(22) PCT Filed: Oct. 3, 2017

(86) PCT No.: PCT/AU2017/051076
§ 371 (c)(1),
(2) Date: Mar. 26, 2019

(87) PCT Pub. No.: WO2018/064717
PCT Pub. Date: Apr. 12, 2018

(65) Prior Publication Data
US 2019/0226938 A1    Jul. 25, 2019

(30) Foreign Application Priority Data

Oct. 5, 2016  (AU) .............................. 2016904029

(51) Int. Cl.
*G01M 3/02*  (2006.01)
*F16L 55/07*  (2006.01)
*F16L 55/105* (2006.01)
*F16K 31/60*  (2006.01)
*F16K 5/04*   (2006.01)
(Continued)

(52) U.S. Cl.
CPC .................. *G01M 3/02* (2013.01); *F16K 5/04* (2013.01); *F16K 5/08* (2013.01); *F16K 27/06* (2013.01); *F16K 27/065* (2013.01); *F16K 31/602* (2013.01); *F16L 55/07* (2013.01); *F16L 55/105* (2013.01); *F16K 31/60* (2013.01)

(58) Field of Classification Search
CPC ..... F16L 55/105; F16L 55/124; G01M 3/022; G01M 3/04
See application file for complete search history.

(56) References Cited

U.S. PATENT DOCUMENTS 1,133,714 A * 3/1915 Elder .................... F16L 55/136
                                                           138/90
1,357,974 A * 11/1920 Gorman ................ F16K 3/0209
                                                           138/94.3
(Continued)

FOREIGN PATENT DOCUMENTS

KR   20090120625 A  * 11/2009  .............. E03C 1/12
WO   WO-9623204 A1 *  8/1996  ............ F16L 55/132
WO   2006053370 A1    5/2006

*Primary Examiner* — David A. Rogers
(74) *Attorney, Agent, or Firm* — The Webb Law Firm

(57) ABSTRACT

A valve assembly includes a valve housing having an inlet, an outlet and an opening, and an insert removably insertable in the opening. The insert has a first side facing upwards and a second side facing downwards when positioned in the opening. The first side and the second side have a conduit positioned therebetween, and a control valve located at least partially within the conduit and movable between an open position and a closed position. The control valve in the closed position stops fluid from passing through the conduit. When the insert is inserted in the opening and the control valve is in the closed position, the insert substantially seals the inlet and stops fluid flowing to the outlet.

22 Claims, 6 Drawing Sheets

(51) Int. Cl.
*F16K 27/06* (2006.01)
*F16K 5/08* (2006.01)

(56) References Cited

U.S. PATENT DOCUMENTS

| | | | | |
|---|---|---|---|---|
| 2,636,713 | A * | 4/1953 | Hamer | F16K 27/047 137/315.31 |
| 2,815,187 | A * | 12/1957 | Hamer | F16K 3/12 251/327 |
| 3,586,031 | A * | 6/1971 | Muller | F16K 55/1108 137/519 |
| 3,860,038 | A * | 1/1975 | Forni | F16L 55/105 285/236 |
| 4,122,869 | A * | 10/1978 | Roberson, Sr. | F16K 7/10 138/93 |
| 4,407,171 | A * | 10/1983 | Hasha | G01M 3/022 73/49.1 |
| 4,429,568 | A * | 2/1984 | Sullivan | G01M 3/022 138/93 |
| 4,602,504 | A * | 7/1986 | Barber | G01M 3/2853 277/609 |
| 4,658,861 | A * | 4/1987 | Roberson, Sr. | F16L 55/124 138/93 |
| 4,763,510 | A * | 8/1988 | Palmer | G01M 3/022 73/40.5 R |
| 4,949,939 | A * | 8/1990 | Almada | F16K 3/12 251/327 |
| 5,033,510 | A | 7/1991 | Huber | |
| 5,076,095 | A * | 12/1991 | Erhardt | G01M 3/2853 138/90 |
| 5,287,730 | A * | 2/1994 | Condon | G01M 3/022 73/49.8 |
| 6,116,262 | A | 9/2000 | Corralejo | |
| 6,131,441 | A * | 10/2000 | Berube | G01M 3/2853 73/49.8 |
| 6,234,007 | B1 * | 5/2001 | Pampinella | G01M 3/04 251/319 |
| D451,984 | S * | 12/2001 | Tigerholm | D8/382 |
| 6,422,064 | B1 * | 7/2002 | Pampinella | G01M 3/04 251/319 |
| 6,655,413 | B2 * | 12/2003 | Condon | G01M 3/022 138/94 |
| 6,672,139 | B2 * | 1/2004 | Pampinella | G01M 3/04 251/319 |
| 6,997,041 | B1 * | 2/2006 | Metzger | G01M 3/2853 251/319 |
| 7,013,711 | B1 * | 3/2006 | Herbers | G01M 3/2815 73/49.1 |
| 7,021,337 | B2 * | 4/2006 | Markham | G01M 3/022 138/93 |
| 7,281,411 | B2 * | 10/2007 | Brewer | G01M 3/28 73/49.1 |
| 7,325,442 | B1 * | 2/2008 | Pampinella | G01M 3/04 251/319 |
| 7,398,675 | B1 * | 7/2008 | Metzger | F16L 55/105 73/40 |
| 7,731,242 | B2 * | 6/2010 | Coscarella | F16L 29/00 285/236 |
| 8,210,029 | B2 * | 7/2012 | Hart | G01M 3/04 73/866.5 |
| 8,887,768 | B2 * | 11/2014 | Hart | G01M 3/2815 138/91 |
| 9,560,805 | B2 * | 2/2017 | Hull | F16K 15/03 |
| 9,964,461 | B2 * | 5/2018 | Hart | G01M 3/022 |
| 10,240,333 | B2 * | 3/2019 | Hull | F16K 15/04 |
| 10,627,329 | B1 * | 4/2020 | Cornwall | F16L 55/136 |
| 10,656,042 | B2 * | 5/2020 | Hart | G01M 3/2853 |
| 2009/0084456 | A1 | 4/2009 | Mantyla | |
| 2010/0037681 | A1 | 2/2010 | Hart et al. | |
| 2020/0116289 | A1 * | 4/2020 | Cosley | G01M 3/022 |
| 2022/0082195 | A1 * | 3/2022 | Cosley | G01M 3/022 |

\* cited by examiner

VALVE ASSEMBLY AND METHOD FOR LEAK TESTING PIPES USING THE VALVE ASSEMBLY

CROSS-REFERENCE TO RELATED APPLICATIONS

This application is the United States national phase of International Application No. PCT/AU2017/051076 filed Oct. 3, 2017, and claims priority to Australian Patent Application No. 2016904029 filed Oct. 5, 2016, the disclosures of which are hereby incorporated by reference in their entirety.

FIELD OF INVENTION

The present invention relates to a valve assembly. The present invention has particular but not exclusive application for use in pipework in buildings.

BACKGROUND OF THE INVENTION

With the construction of new buildings and building renovations, pipework is tested to ensure that it holds water or air and there are no leaks.

To test the pipework, a plumber usually positions a plug in a discharge pipe above or in an inspection outlet. Water then fills the pipework and the pipework can be inspected and certified.

After the inspection, the plumber removes the plug. The accumulated water is under pressure and can force the plug towards the plumber as it is being removed. This poses a potential injury risk for the plumber and is a safety concern.

Furthermore, as the plug is removed from the inspection outlet, some of the accumulated water can discharge via the inspection outlet.

The current method of testing pipework is not safe for the plumber or person testing for leaks.

OBJECT OF THE INVENTION

It is an object of the present invention to provide a valve assembly that provides a safe method of testing pipework in buildings that overcomes at least in part one or more of the abovementioned problems and/or provide the consumer with a useful or commercial choice.

SUMMARY OF THE INVENTION

In one aspect the present invention broadly resides in a valve assembly including:
 a valve housing having an inlet, an outlet and an opening; and
 an insert removably insertable in the opening, the insert having a first side facing upwards and a second side facing downwards when positioned in the opening, the first side and the second side have a conduit positioned therebetween; and
 a control valve located at least partially within the conduit and movable between an open position and a closed position, the control valve in the closed position stops fluid from passing through the conduit,
 wherein when the insert is inserted in the opening and the control valve is in the closed position, the insert substantially seals the inlet and stops fluid flowing to the outlet.

Preferably the insert when located in the opening is securable in the opening. In one form, the insert is securable in the opening by providing a friction fit between the opening and the insert. In another form the insert is securable in the opening by a cap which at least partially covers the opening.

In another aspect the present invention broadly resides in a valve assembly including:
 a valve housing having an inlet, an outlet and an opening; and
 an insert removably insertable in the opening, the insert having a first side facing upwards and a second side facing downwards when positioned in the opening, the first side and the second side have a conduit positioned therebetween;
 a control valve located at least partially within the conduit and movable between an open position and a closed position, the control valve in the closed position stops fluid from passing through the conduit; and
 a cap to secure the insert in the opening,
 wherein when the insert is inserted in the opening and the control valve is in the closed position, the insert substantially seals the inlet and stops fluid flowing to the outlet.

Preferably the control valve further comprises a handle to move the valve between the open position and the closed position. Preferably the control valve is a rotary valve. Alternatively, the control valve may be a globe valve, butterfly valve, gate valve, ball valve, or the like.

Preferably the valve housing includes a rebate portion located within the opening. Preferably, when the insert is inserted in the opening, the first side of the insert is parallel to the rebate portion. Preferably, when the insert is inserted in the opening, the first side of the insert is adjacent to the rebate portion. Preferably the surface of the rebate portion is transverse to a direction of flow between the inlet and the outlet of the valve housing. Preferably the rebate portion is angled between 30° and 60° relative to the direction of flow between the inlet and outlet. More preferably the rebate portion is angled about 45° relative to the direction of flow between the inlet and the outlet.

Preferably a seal is located between the rebate portion and the first side of the insert when the insert is inserted in the opening. Preferably the seal is attached to the first side of the insert. Alternatively, the seal may be attached to the rebate portion. Preferably the seal is a face seal.

Preferably the cap at least partially covers the opening. Preferably the cap includes an aperture. Preferably the aperture provides access to the control valve when the insert is inserted in the opening and the cap secures the insert in the opening. More preferably the aperture provides access to the handle of the control valve. Preferably the cap includes a threaded portion adapted to secure the cap to a corresponding threaded portion on or in the opening of the valve housing.

Preferably the insert includes a fitting which provides access between the first side of the insert and a third side of the insert. Preferably the third side of the insert is accessible through the aperture of the cap when the insert is inserted in the opening and the cap secures the insert in the opening. Preferably the fitting can be used to introduce water into the valve housing. In a preferred form the fitting enables a hose to be attached thereto to supply water or air into the valve housing. In a preferred embodiment, the fitting requires drilling and/or taping before it can be initially used. Preferably a plug can be secured in the fitting to prevent flow between the first side and the third side of the insert. In the preferred embodiment, after the fitting has been drilled and/or taped a plug can be secured in the fitting to prevent flow between the first side and the third side of the insert.

Preferably the insert includes at least one handle to assist in removing the insert from the opening. Preferably the at least one handle are two handles.

Preferable the valve assembly further includes an adapter to attach the inlet of the valve housing to pipework. Preferably the adapter is insertable into the inlet of the valve housing. Preferably a seal is located between the adapter and the inlet of the valve housing.

In one embodiment, the opening of the valve housing is sealed with a cap when the insert is not located in the opening.

In another embodiment a flow-through sleeve may be inserted in the opening of the valve housing when the insert is not located in the opening. Preferably the flow-through sleeve has an opening between a first side of the flow-through sleeve and a second side of the flow-through sleeve. Preferably the opening of the flow-through sleeve has a diameter substantially the same as the diameter of the inlet and/or of the outlet. Preferably the flow-through sleeve inhibits water from flowing from the inlet out through the opening. Preferably the flow-through sleeve is secured in the opening by a cap.

Preferably the valve assembly is made predominantly of Polyvinyl chloride (PVC). Alternatively, the valve assembly may be made predominantly of High-density polyethylene (HDPE).

In a further aspect the present invention broadly resides in a valve assembly including:

a valve housing having an inlet for receiving fluid, an outlet for discharging fluid and an opening; and an insert removably insertable in the opening, the insert having a first side facing upwards and a second side facing downwards when the insert is positioned in the opening, the first side and the second side having a conduit positioned therebetween, a control valve located at least partially within the conduit and movable between an open position and a closed position, wherein in use the insert is inserted in the opening and the control valve is in the closed position and fluid is prevented from passing through to the outlet.

In another aspect the present invention broadly resides in a valve assembly including:

a valve housing having an inlet, an outlet and an opening; and an insert removably insertable in the opening, the insert having a first side facing upwards and a second side facing downwards when positioned in the opening, the first side and the second side have a conduit positioned therebetween;

a control valve located at least partially within the conduit and movable between an open position and a closed position, the control valve in the closed position stops fluid from passing through the conduit; and a cap to secure the insert in the opening, wherein the insert with the control valve in the closed position is inserted in the opening and secured by the cap to stop fluid flowing to the outlet, then after predetermined parameters are met, the cap is removed and the insert is removed from the opening, after the insert is removed from the opening the opening is sealed.

Preferably the predetermined parameters include steps required to test for leaks in pipework above the valve assembly. Preferably the steps required to test for leaks include introducing water into the pipework above the valve assembly, inspecting the pipework for leaks and opening the control valve to discharge the accumulated water from the pipework.

Preferably the cap has an aperture so that the control valve is accessible when the cap secures the insert in the opening.

In one embodiment the opening is sealed using a completely covered cap. In this embodiment, there is preferably positioned a flow-through sleeve in the opening. Where the valve housing includes a rebate portion located within the opening, the flow-through sleeve is preferably located in the opening, where the flow-through sleeve at least partially abuts the rebate portion.

In another embodiment the opening is sealed by inserting a flow-through sleeve in the opening and securing the flow-through sleeve with a cap which can be a partially covered cap or a fully covered cap. In one form, the cap which secures the flow-through sleeve in the opening is the same cap that secures the insert in the opening.

The first side facing upwards and the second side facing downwards when positioned in the opening can also be referred to as the first side facing upstream and a second side facing downstream when positioned in the opening.

In a further aspect the present invention broadly resides in a valve assembly including:

a valve housing having an inlet, an outlet and an opening; and an insert removably insertable in the opening, the insert having a first side and a second side facing away from the first side, the first side and the second side have a conduit positioned therebetween; and a control valve located at least partially within the conduit and movable between an open position and a closed position, the control valve in the closed position stops fluid from passing through the conduit, wherein when the insert is inserted in the opening and the control valve is in the closed position, the insert substantially stops fluid flowing from the inlet to the outlet.

In a further aspect the present invention broadly resides in a method of testing pipework using a valve assembly as described in any one of the above mentioned aspects, the method including the steps of:

locating the valve assembly in a suitable position in the pipework;

inserting the insert in the opening of the valve housing;

ensuring that the control valve is in the closed position;

filling water into the pipework above the inlet of the valve assembly;

moving the control valve to the open position after one or more predetermined parameters are satisfied, to discharge water through the control valve;

removing the insert from the opening of the valve housing after the water has been substantially discharged; and sealingly closing the opening after the insert has been removed.

Preferably the step of sealingly closing the opening after the insert has been removed includes securing a cap over the opening of the valve housing. Preferably the step of sealingly closing the opening after the insert has been removed includes inserting a flow-through sleeve into the opening of the valve housing. Preferably the flow-through sleeve is inserted into the opening of the valve housing prior to securing the cap over the opening of the valve housing.

Preferably the step of inserting the insert in the opening of the valve housing includes securing the insert in the opening. Preferably the step of securing the insert in the opening includes securing a cap over the opening. Preferably the cap has an aperture so that the control valve can be accessed through the cap.

The one or more predetermined parameters could include prerequisite checks for leaks in the pipework above the valve assembly according to building regulations. Preferably the one or more predetermined parameters include checks for leaks in the upstream portion of the pipework. Preferably the upstream portion of the pipework is the pipework above the valve assembly.

In another aspect, the invention broadly resides in a method of testing pipework using a valve assembly, the method including the steps of:

locating the valve assembly in a suitable position in the pipework, the valve assembly having a valve housing with an inlet, an outlet and an opening, the inlet connected to an upstream portion of the pipework and the outlet connected to a downstream portion of the pipework;

inserting an insert in the opening of the valve housing, the insert having a first side facing upwards and a second side facing downwards when positioned in the opening, the first side and the second side have a conduit positioned therebetween; and a control valve located at least partially within the conduit and movable between an open position and a closed position;

ensuring that the control valve is in the closed position;

filling water into the pipework above the inlet of the valve assembly;

moving the control valve to the open position after one or more predetermined parameters are satisfied, to discharge water through the control valve;

removing the insert from the opening of the valve housing after the water has been substantially discharged; and sealingly closing the opening after the insert has been removed.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
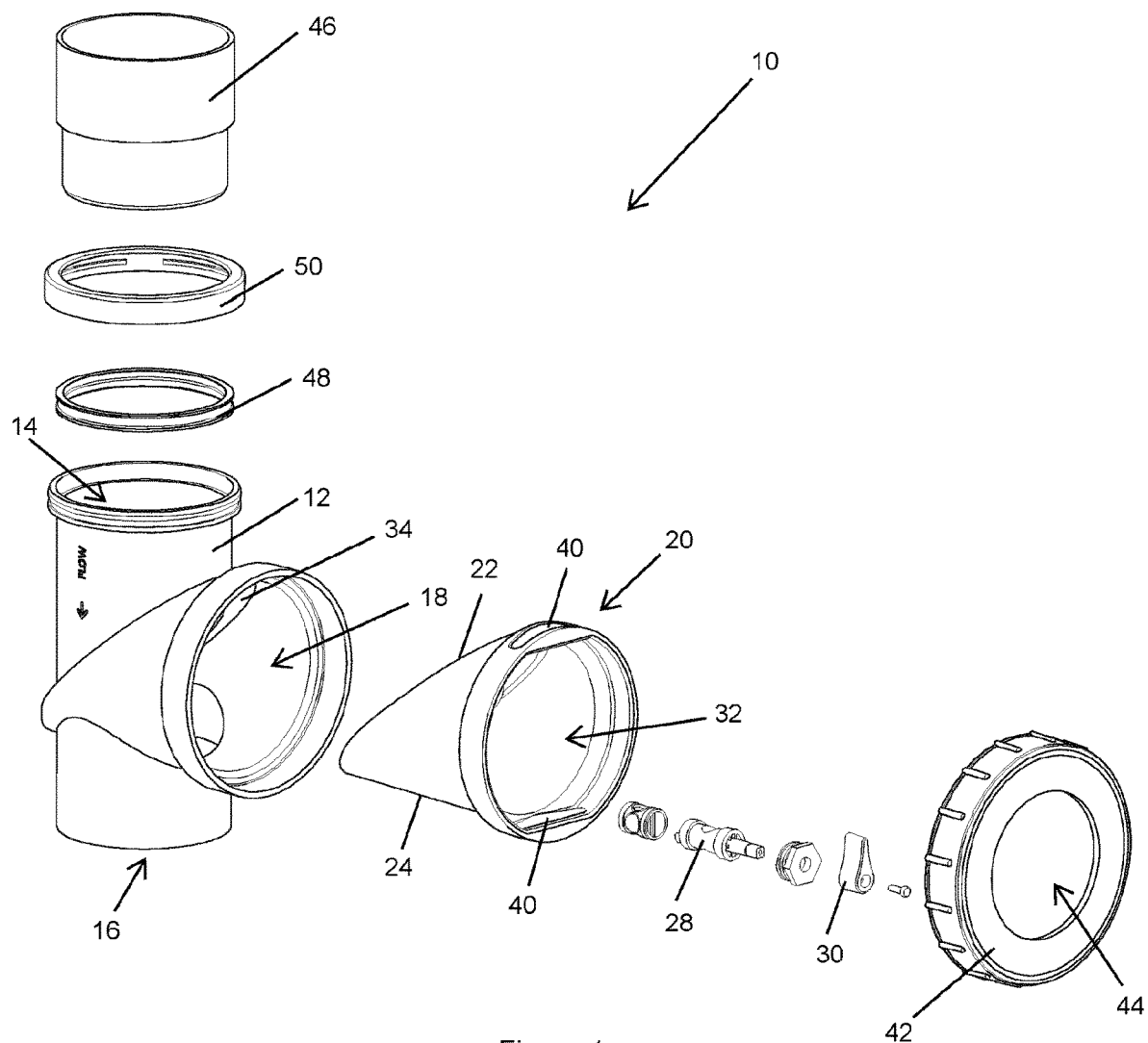
FIG. 1 is an exploded view of a valve assembly according to an embodiment of the present invention.
Figure 2:
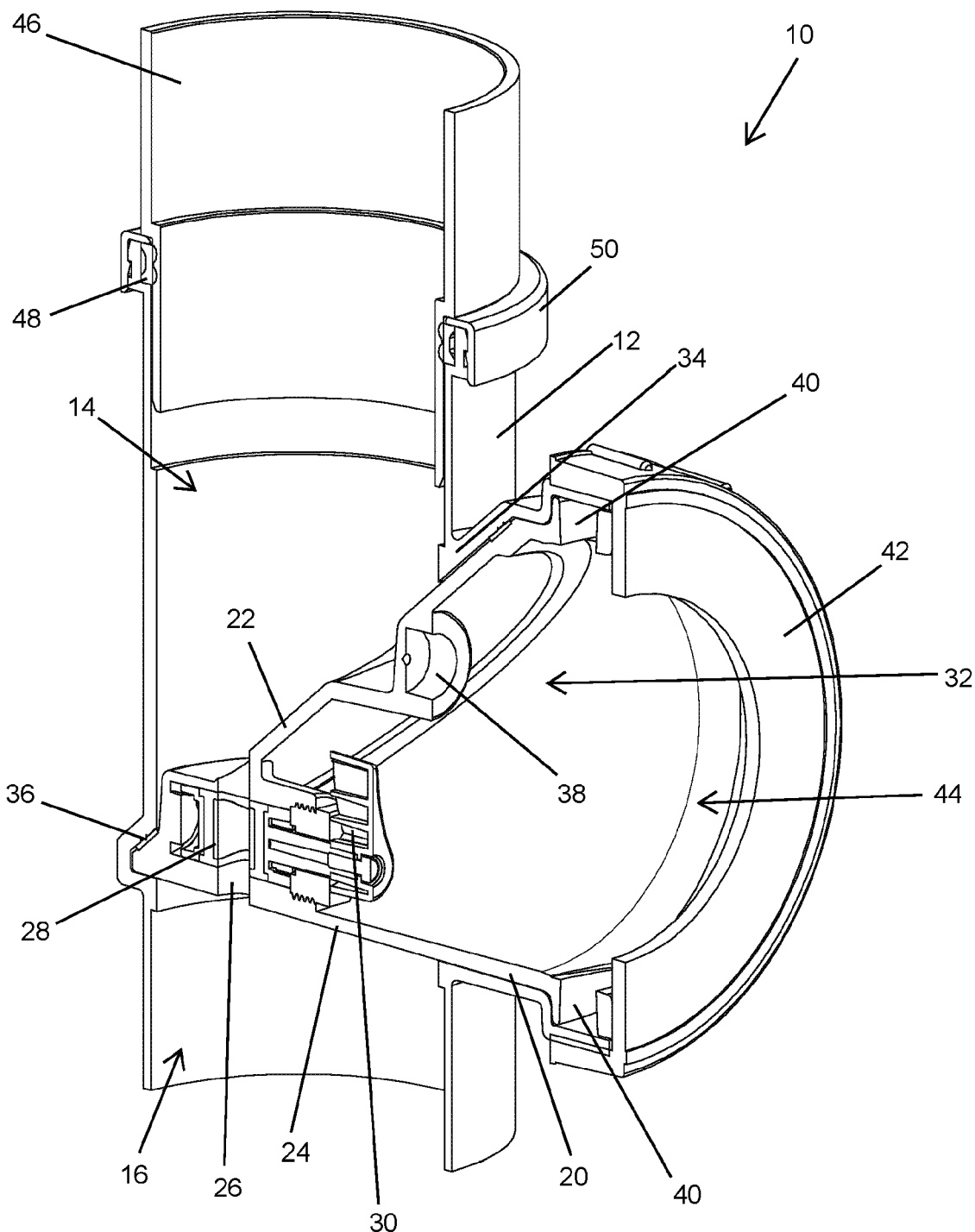
FIG. 2 is a section view of the valve assembly of FIG. 1.

With reference to FIGS. 1 and 2, there is shown a valve assembly 10. FIG. 1 shows an exploded view of the valve assembly 10 and FIG. 2 shows a sectioned view of the valve assembly 10. The valve assembly has a valve housing 12. The valve housing 12 has an inlet 14, an outlet 16 and an opening 18. The opening 18 is shaped to receive an insert 20.

The insert 20 has a first side 22 and a second side 24. A conduit 26 is located between the first side 22 and the second side 24. A control valve in the form of a rotary valve is located partially within the conduit 26. The rotary valve 28 is movable between an open position (as seen in FIG. 2) where the conduit 26 fluidly connects the first side 22 to the second side 24, and a closed position (not shown, when the control valve is turned 90°) where the control valve prevents fluid from flowing through the conduit 26. A handle 30 is attached to the rotary valve 28 so that the rotary valve 28 can be moved between the open position and closed position. The handle is located on a third side 32 of the insert 20.

When the insert 20 is located in the opening 18, the first side 22 is located adjacent a rebate portion 34. A seal 36 (best seen in FIG. 2) is located between the rebate portion 34 and the first side 22 of the insert 20. The seal 36 is attached to the first side 22 of the insert 20. When the insert 20 is inserted into the opening 18 and the control valve 28 is in the closed position (not shown) the insert 20 substantially seals the inlet 14 from the outlet 16 preventing fluid flow between the inlet 14 and the outlet 16.

The insert 20 has a fitting 38 located on the third side 32 of the insert 20. The fitting can be drilled and tapped so that there is an opening between the first side 22 and the third side 32. A hose (not shown) can be connected to the drilled and tapped fitting 38 to introduce water into the valve housing 12. If the fitting 38 is drilled and tapped, a plug (not shown) can be inserted into the fitting 38 to prevent fluid flow between the first side 22 and the third side 32 of the insert 20.

The insert has at least one handle in the form of two handles 40. The two handles 40 can assist in removing the insert 20 from the opening 18.

A cap secures 42 secures the insert 20 in the opening 18. The cap 42 has an aperture 44. The apertures 44 provides access to the handle 30 of the rotary valve 28 and to the fitting 38.

The valve assembly 10 has an adapter 46 which is insertable into the inlet 14. A seal 48 seals between the inlet 14 and the adapter 46. A locking collar 50 secures the adapter 46 in the inlet 14. The adapter 46 enables the valve assembly 10 to be joined to pipework (not shown) located above the valve assembly 10. As seen in FIGS. 1 and 2, the fitting 38 is separate from the control valve 28. Furthermore, the fitting 38 is spaced apart from the control valve 28 and located further towards the inlet 14 of the valve housing 12 when the insert 20 is inserted in the opening 18.

Figure 3:
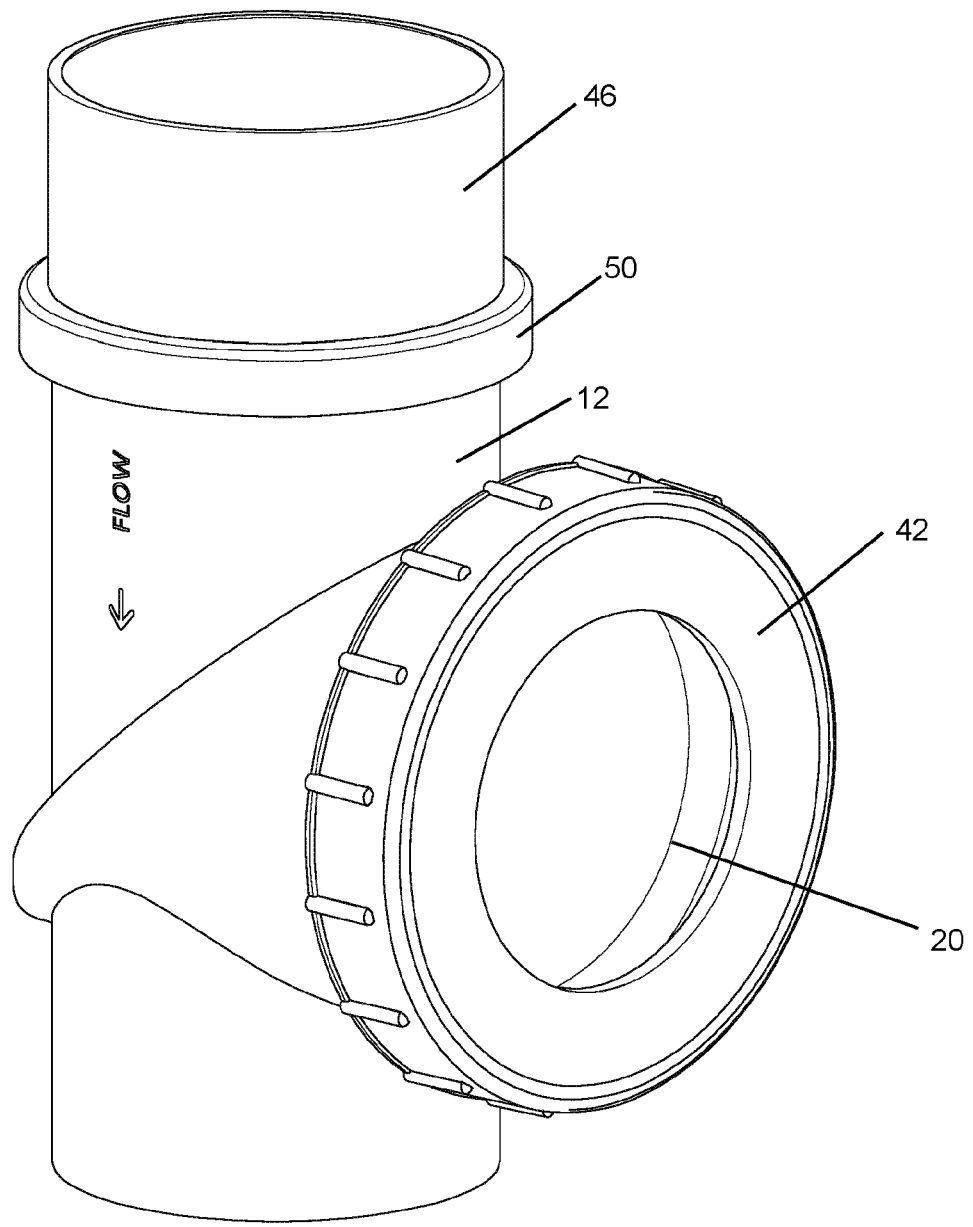
FIG. 3 is a perspective view of the valve assembly of FIG. 2.

FIG. 3 shows a perspective view of the valve assembly 10 of FIGS. 1 and 2.

Figure 4:
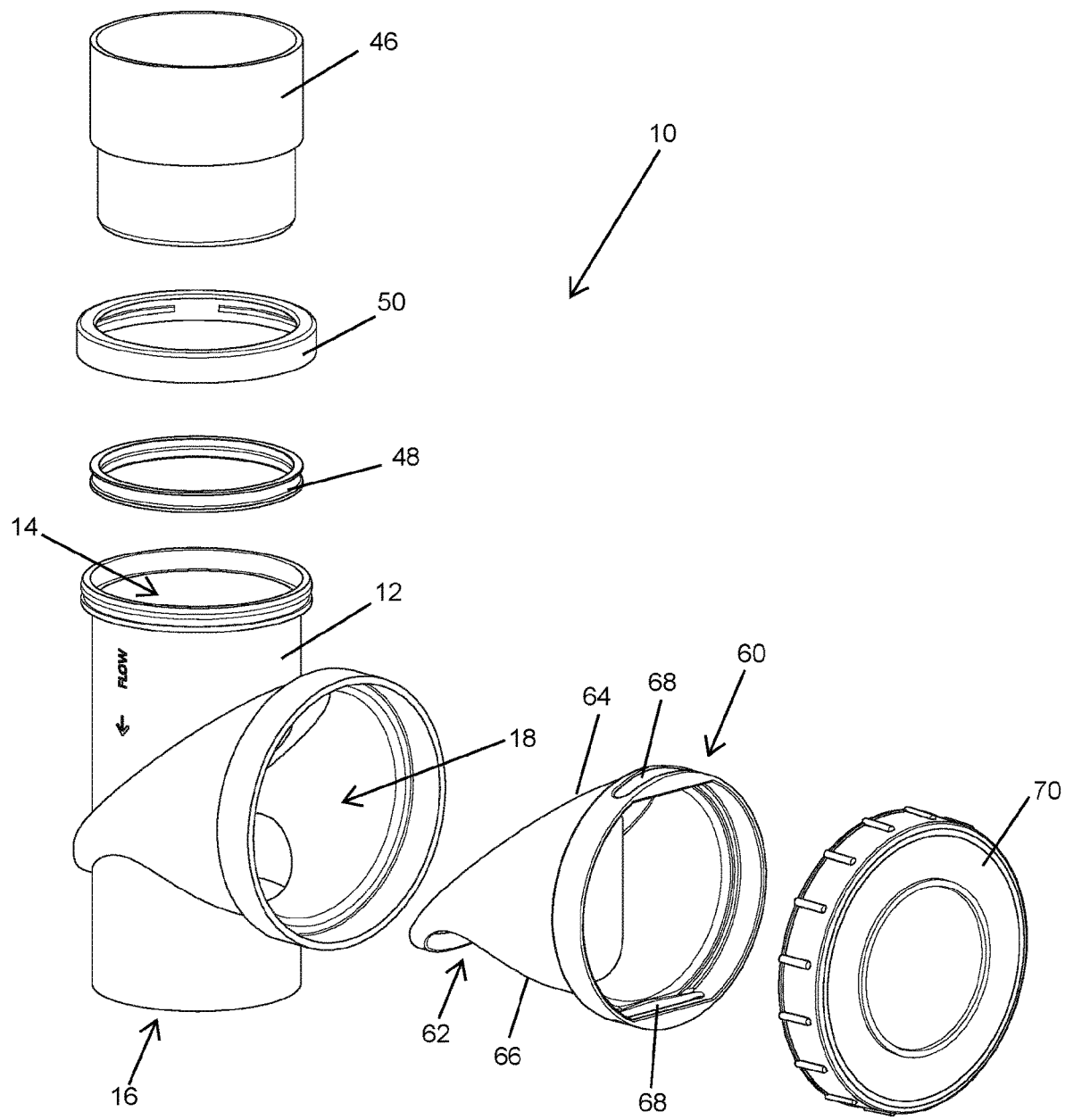
FIG. 4 is an exploded view of a valve assembly with a flow-through sleeve according to an embodiment of the present invention.
Figure 5:
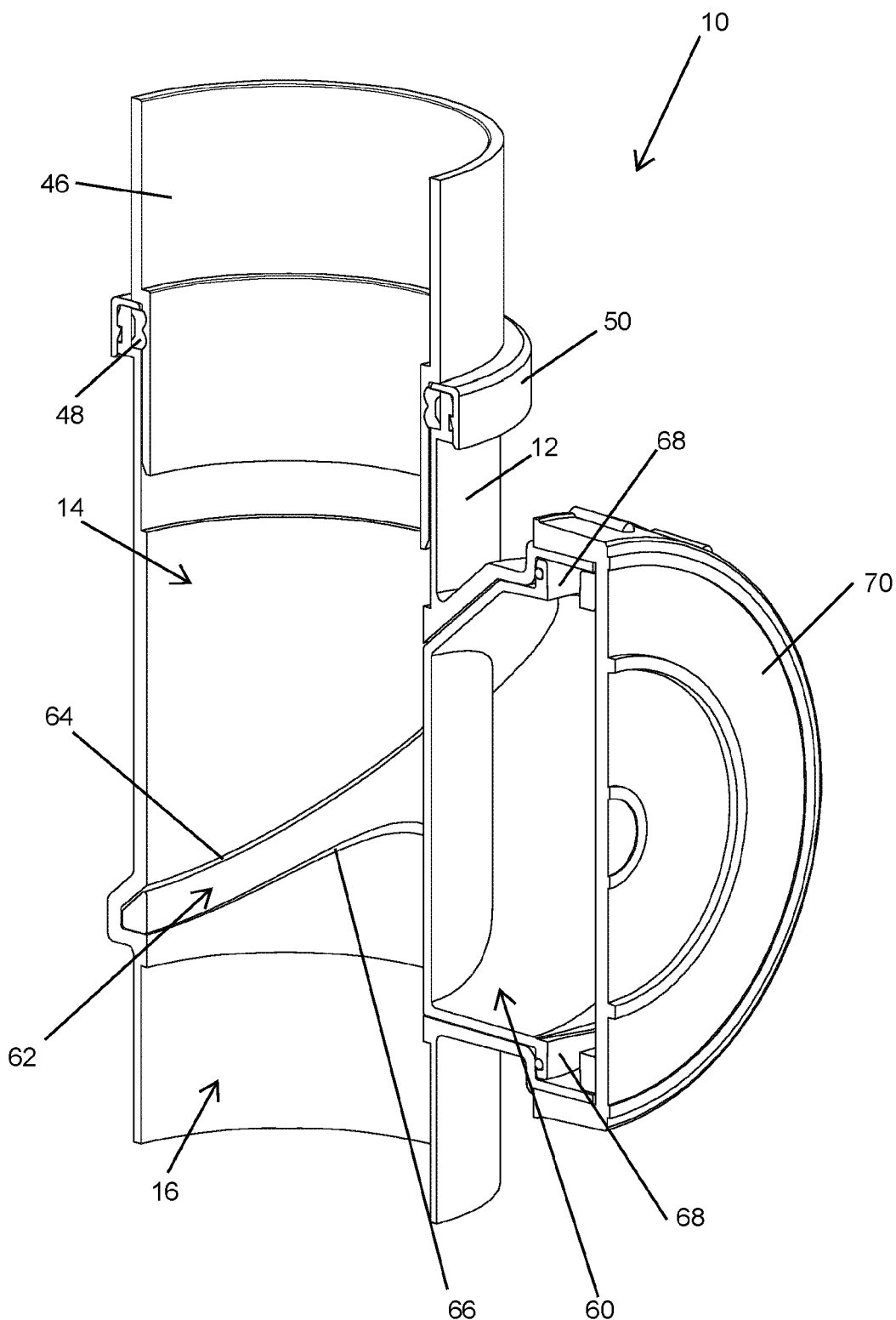
FIG. 5 is a section view of the valve assembly of FIG. 4.

With reference to FIGS. 4 and 5, there is shown the valve assembly 10 having a flow-through sleeve 60 and a cap 70. FIG. 4 shows an exploded view of the valve assembly 10 and FIG. 5 shows a sectioned view of the valve assembly 10.

The flow-through sleeve 60 has an opening 62 between a first side 64 of the flow-through sleeve 60 and a second side 66 of the flow-through sleeve 60. The opening 62 has substantially the same diameter as the inlet 14 and the outlet 16 of the valve housing 12. The flow-through sleeve 60 has two handles 68. The two handles 68 can assist in removing the flow-through sleeve 60 from the opening 18.

The cap 70 secures the flow-through sleeve 60 in the opening 18.

Figure 6:
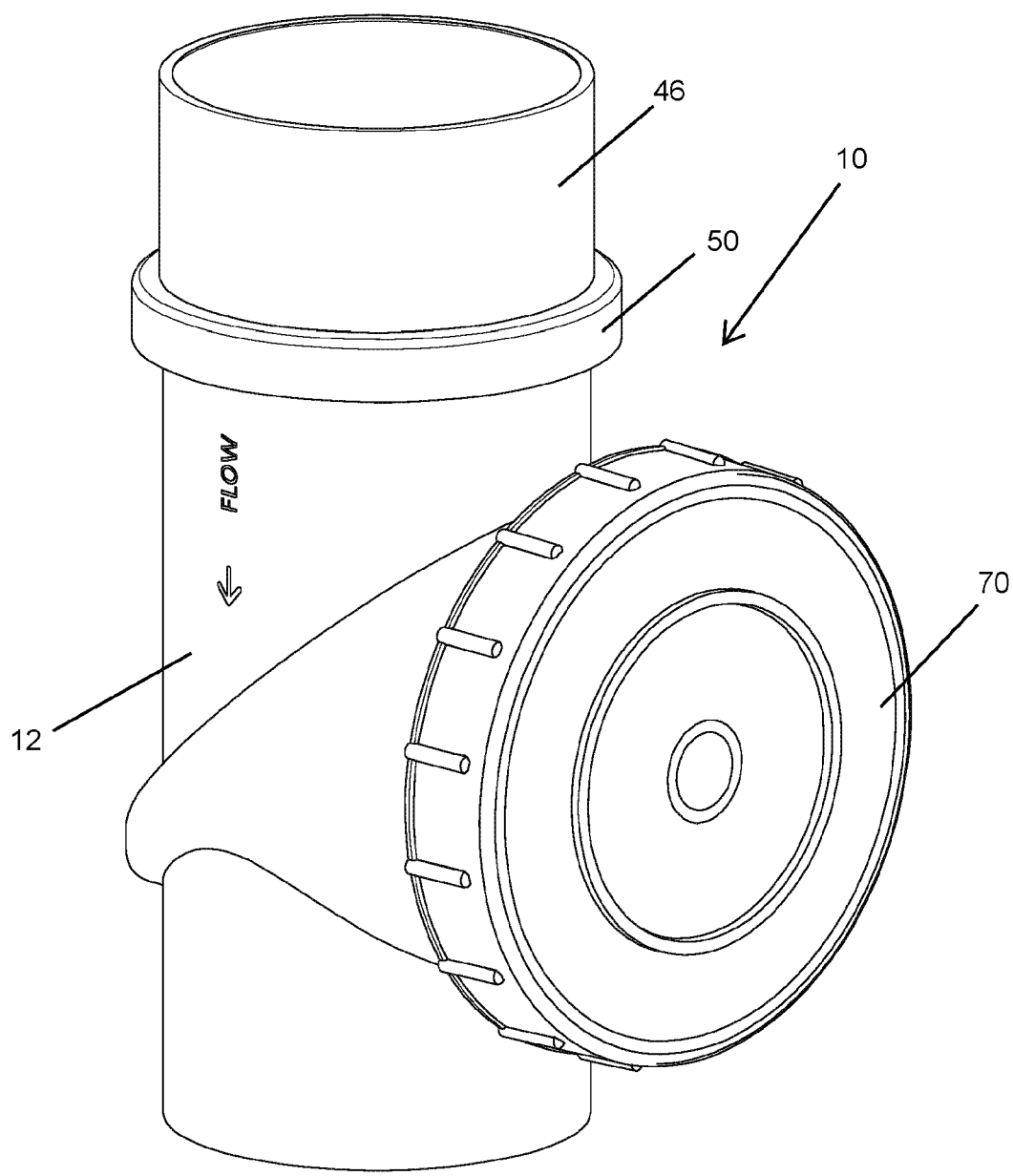
FIG. 6 is a perspective view of the valve assembly of FIG. 5.

FIG. 6 shows a perspective view of FIGS. 4 and 5.

In use, with reference to FIGS. 1 and 2, when pipework (not shown) above the valve assembly 10 is to be inspected, the insert 20 is secured in the opening 18 by the cap 42. The control valve 28 is turned to a closed position (not shown). In this manner, the insert 20 seals the inlet 14 of the valve housing 12 from the outlet 16 of the valve housing 12.

Water is filled into the pipework (not shown) above the valve assembly 10. The pipework (not shown) above the valve assembly 10 can then be inspected for leaks and certified according to building regulations. In an alternate embodiment (not shown) water can be introduced through a drilled and tapped fitting 38.

After the pipework (not shown) above the valve assembly 10 has been inspected, the control valve 28 can be moved to the open position (as seen in FIG. 2), this allows the accumulated water in the pipework (not shown) to discharge through the control valve 28.

After the accumulated water has substantially discharged through the control valve 28, the insert 20 is removed from the opening 18.

With reference now to FIGS. 4 and 5, after the insert 20 has been removed from the opening 18, the flow-through sleeve 60 is inserted into the opening 18 and secured by cap 70. The flow-through sleeve 60 allows fluid to flow between the inlet 14 and the outlet 16 of the valve housing 12.

Advantages

An advantage of the preferred embodiment includes that accumulated water can be substantially discharged from pipework above the valve assembly prior to the insert being removed from the opening. This can prevent the insert from being forced out by the pressure of the accumulated water and can also prevent or minimise water discharging through the opening as the insert is being removed.

Furthermore, the cap having an aperture allows access to the control valve when the insert is secured in the opening.

The use of a seal between the first side of the insert and the rebate portion of the valve housing prevents fluid flow between the inlet and the outlet of the valve housing when the control valve is in the closed position.

The preferred embodiment of the valve assembly provides a device that enables safe testing of the pipework in a building.

Variations

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A valve assembly comprising:
   a valve housing having an inlet, an outlet and an opening; and
   an insert removably insertable in the opening, the insert having a first side facing upwards and a second side facing downwards when positioned in the opening, the first side and the second side have a conduit positioned therebetween; and
   a control valve located at least partially within the conduit and movable between an open position and a closed position, the control valve in the closed position stops fluid from passing through the conduit,
   wherein when the insert is inserted in the opening and the control valve is in the closed position, the insert substantially seals the inlet and stops fluid flowing to the outlet;
   wherein the insert includes a fitting which provides access between the first side of the insert and a third side of the insert; and
   wherein the fitting is separate from the control valve.

2. The valve assembly as claimed in claim 1, wherein the insert is securable in the opening by providing a friction fit between the opening and the insert.

3. The valve assembly as claimed in claim 1, wherein the insert is securable in the opening by a cap which at least partially covers the opening.

4. The valve assembly as claimed in claim 3, wherein the cap includes an aperture which provides access to the control valve when the insert is inserted in the opening and the cap secures the insert in the opening.

5. The valve assembly as claimed in claim 1, wherein the valve housing includes a rebate portion located within the opening, and wherein when the insert is inserted in the opening, the first side of the insert is parallel to the rebate portion.

6. The valve assembly as claimed in claim 5, wherein the rebate portion is transverse to a direction of flow between the inlet and the outlet of the valve housing.

7. The valve assembly as claimed in claim 5, wherein the rebate portion is angled between 30° and 60° relative to the direction of flow between the inlet and outlet.

8. The valve assembly as claimed in claim 1, wherein the fitting requires drilling and/or tapping before it can be initially used.

9. The valve assembly as claimed in claim 1, wherein the fitting can introduce water into the valve housing.

10. The valve assembly as claimed in claim 9, wherein a plug can be secured in the fitting to prevent flow between the first side and the third side of the insert.

11. The valve assembly as claimed in claim 1 further including an adapter to attach the inlet of the valve housing to pipework.

12. The valve assembly as claimed in claim 11, wherein a seal is located between the adapter and the inlet of the valve housing.

13. The valve assembly as claimed in claim 1, further including a flow-through sleeve having an opening between a first side of the flow-through sleeve and a second side of the flow-through sleeve, wherein the flow-through sleeve is insertable in the opening of the valve housing when the insert is not located in the opening, to facilitate flow between the inlet and the outlet.

14. The valve assembly as claimed in claim 13, wherein, when inserted in the opening of the valve housing, the flow-through sleeve inhibits water from flowing from the inlet out through the opening.

15. A method of testing pipework using a valve assembly, the method comprising the steps of:
   locating the valve assembly in a suitable position in the pipework, the valve assembly having a valve housing with an inlet, an outlet and an opening, the inlet connected to an upstream portion of the pipework and the outlet connected to a downstream portion of the pipework;
   inserting an insert in the opening of the valve housing, the insert having a first side facing upwards and a second side facing downwards when positioned in the opening, the insert includes a fitting which provides access between the first side of the insert and a third side of the insert, the first side and the second side have a conduit positioned therebetween; and a control valve located at least partially within the conduit and movable between an open position and a closed position;

ensuring that the control valve is in the closed position;

using the fitting to fill water into the pipework above the inlet of the valve assembly;

moving the control valve to the open position after one or more predetermined parameters are satisfied, to discharge water through the control valve;

removing the insert from the opening of the valve housing after the water has been substantially discharged; and sealingly closing the opening after the insert has been removed.

16. The method as claimed in claim 15, wherein the step of sealingly closing the opening after the insert has been removed includes securing a cap over the opening of the valve housing.

17. The method as claimed in claim 16, wherein the step of sealingly closing the opening after the insert has been removed includes inserting a flow-through sleeve into the opening of the valve housing.

18. The method as claimed in claim 15, wherein the step of inserting the insert in the opening of the valve housing includes securing the insert in the opening.

19. The method as claimed in claim 18, wherein the step of securing the insert in the opening includes securing a cap over the opening, and wherein the cap has an aperture so that the control valve can be accessed through the cap.

20. The method as claimed in claim 15, wherein the one or more predetermined parameters include checks for leaks in the upstream portion of the pipework.

21. The valve assembly of claim 1, wherein the control valve is a rotary valve, globe valve, butterfly valve, gate valve or ball valve.

22. The valve assembly as claimed in claim 1, wherein the fitting is spaced apart from the control valve and located further towards the inlet of the valve housing when the insert is inserted in the opening.

* * * * *